United States Patent
Bathija et al.

(10) Patent No.: US 10,178,095 B2
(45) Date of Patent: *Jan. 8, 2019

(54) RELAYED NETWORK ACCESS CONTROL SYSTEMS AND METHODS

(71) Applicant: Vivint, Inc., Provo, UT (US)

(72) Inventors: Pravin Bathija, San Jose, CA (US); Venkat Kalkunte, Saratoga, CA (US)

(73) Assignee: Vivint, Inc., Provo, UT (US)

( * ) Notice: Subject to any disclaimer, the term of this patent is extended or adjusted under 35 U.S.C. 154(b) by 40 days.

This patent is subject to a terminal disclaimer.

(21) Appl. No.: 15/396,731

(22) Filed: Jan. 2, 2017

(65) Prior Publication Data
US 2017/0214692 A1    Jul. 27, 2017

Related U.S. Application Data

(63) Continuation of application No. 14/588,158, filed on Dec. 31, 2014, now Pat. No. 9,537,862.

(51) Int. Cl.
*H04L 29/06* (2006.01)
*H04L 12/801* (2013.01)

(52) U.S. Cl.
CPC .......... *H04L 63/0892* (2013.01); *H04L 47/10* (2013.01); *H04L 63/10* (2013.01); *H04L 67/42* (2013.01)

(58) Field of Classification Search
CPC .................................................. H04L 63/0281
USPC ............................................................ 726/4
See application file for complete search history.

(56) References Cited

U.S. PATENT DOCUMENTS

| | | | | |
|---|---|---|---|---|
| 7,188,253 | B2 * | 3/2007 | Halasz | H04L 63/061 713/163 |
| 8,805,946 | B1 * | 8/2014 | Glommen | H04L 67/10 709/206 |
| 8,887,233 | B2 * | 11/2014 | Krishna | H04L 63/0281 713/168 |
| 9,537,862 | B2 * | 1/2017 | Bathija | H04L 63/0892 |
| 2013/0309971 | A1 | 11/2013 | Kiukkonen et al. | |
| 2015/0121481 | A1 | 4/2015 | Venkatanaranappa et al. | |

* cited by examiner

*Primary Examiner* — Longbit Chai
(74) *Attorney, Agent, or Firm* — Holland & Hart, LLP

(57) ABSTRACT

A computer system for authenticating and managing network traffic may comprise a network link providing a connection to a network, an authentication, authorization, and accounting (AAA) server configured to provide AAA management for the network link, an access controller configured to communicate with the AAA server and to control access to the network link, and a subnetwork of client devices connected to an intermediate relay node. The client devices may be configured to communicate with the access controller and the network link through the intermediate relay node. Also methods and processes by which an intermediate relay node and an access controller may operate in the network for authentication of client devices and routing of network traffic.

19 Claims, 10 Drawing Sheets

FIG. 1 – PRIOR ART

RELAYED NETWORK ACCESS CONTROL SYSTEMS AND METHODS

CROSS-REFERENCE TO RELATED APPLICATIONS

The present application is a continuation of U.S. patent application Ser. No. 14/588,158, titled: "RELAYED NETWORK ACCESS CONTROL SYSTEMS AND METHODS", filed on Dec. 31, 2014. The disclosure of which is incorporated by reference herein in its entirety.

BACKGROUND

The present disclosure relates generally to the deployment and administration of authenticated computer networks. A software access controller is typically used in networks to authenticate clients trying to get access to the network. These individual clients are typically paid subscribers wanting to access the Internet. The controller acts as a conduit to authenticate their credentials with a central server before granting that access.

A typical controller has three major network interfaces: a downlink interface for accepting connections from clients, a RADIUS interface (which may be a link to an authentication, authorization, and accounting (AAA) server) for authenticating clients, and an uplink interface for forwarding traffic to other networks (e.g., the Internet).

Authentication of clients is often performed by an external RADIUS server, wherein information about a client may be stored in either an authenticated or an unauthenticated state. If unauthenticated, web requests from the client are redirected to an authentication web server commonly known as a captive portal, whereby "captive" clients may obtain authentication by submitting authenticated user or device credentials that permit access to the web or other network.

In a typical application, unauthenticated clients are forwarded to a web server (i.e., the captive portal) and prompted for a username and password. The web server forwards these user credentials to the access controller by means of web browser redirects. From the access controller, authentication requests are forwarded to the RADIUS server. If authentication is successful, the state of the client is changed to authenticated, and the client is granted access to the network outside the captive portal by the access controller.

In these computer systems, the network path through which access control is performed (i.e., the "control path") and the network path through which network traffic (e.g., website data) is transferred (i.e., the "data path") are the same. This means that the access controller controls the flow of both the control path and the data path, and it is thus a single point of failure in the network. For this reason, the access controller needs to function as a router (or be part of a router) in the data path and must sustain high computing loads. Hardware requirements for the access controller are therefore high since it must handle multiple paths of traffic simultaneously. These requirements are burdensome to network operators by increasing costs and reducing options when an access controller malfunctions. Furthermore, client devices must be authenticated by the access controller every time information is exchanged through the access controller in such network configurations, so network performance is slowed to the detriment of the user experience.

When clients in the network are divided into sub-networks, each sub-network must be linked to a router by a dedicated access controller directing the control and data paths. It may be prohibitively expensive to provide a robust access controller at each of these sub-networks as the size of the overall network grows. Also, as the number of sub-networks grows, routers must handle ever-increasing loads imposed by the sub-networks' access controllers. Thus, the conventional model limits the total scalability of the system.

As these networks proliferate, customers and network providers have felt an increasing need for lower-cost and better-scaling solutions.

SUMMARY

According to at least one embodiment, a computer system for authenticating and managing network traffic is provided. The system may comprise a network link providing a connection to a network, an authentication, authorization, and accounting (AAA) server configured to provide AAA management for the network link, an access controller configured to communicate with the AAA server and to control access to the network link, and a subnetwork of client devices. The client devices may be connected to an intermediate relay node and configured to communicate with the access controller and the network link through the intermediate relay node.

The intermediate relay node may be configured to access a database of authenticated client devices. In some cases, the intermediate relay node may be configured to restrict network link access to client devices that are not in the database. The database of authenticated client devices may associate an authenticated client device with the intermediate relay node to which the authenticated client device is connected.

The access controller may store a database of authenticated client devices, and may be configured to add a client device to the database when credentials of the client device are verified by the AAA server. The AAA server may be a Remote Authentication Dial In User Service (RADIUS) server.

In some embodiments the access controller may be connected to a plurality of subnetworks of client devices. Each subnetwork may comprise an intermediate relay node and each intermediate relay node may store a specific database of authenticated client devices for the subnetwork of which the intermediate relay node is a part. A router may link the plurality of subnetworks to the access controller, and the plurality of subnetworks may be connected to one network interface of the access controller.

The access controller may be isolated from a data path between the intermediate relay node and the network link. In some cases the intermediate relay node may route communications between the client devices and the network link along a data path, and the access controller does not relay information through the data path.

In at least another embodiment, a method of network authentication in a computer network is described. The method may comprise receiving a network access request from an intermediate relay node, wherein the network access request may comprise credentials originating from a client device, determining whether the client device is approved for network access, and sending an approval for network access to the intermediate relay node if the client device is approved for network access.

In the method, determining whether the client device is approved for network access may comprise sending a verification request to an AAA server, wherein the verification request may comprise the credentials, and receiving an authentication signal from the AAA server, wherein the authentication signal may indicate whether the client device is approved for network access. In another embodiment, determining whether the client device is approved for network access may comprise determining whether the client device is included in a database of client devices for another intermediate relay node. Here, the database may comprise client devices approved for network access for the other intermediate relay node.

In the method, sending the approval for network access may comprise adding the client device to a database of approved client devices and sending the database to the intermediate relay node connected to the client device. The method may also comprise adding the client device to another database of approved client device for an intermediate relay node to which the client device is not connected. Determining whether the client device is approved for network access may include requesting credentials from a client in coordination with a captive portal.

In another embodiment, a method of network authentication in a computer network is provided, wherein the method comprises receiving a network access request originating from a client device, wherein the network access request may comprise identifying information; determining whether the identifying information is in a database of approved client devices; and granting network access for the client device if the identifying information is authenticated in the database. If the identifying information is not authenticated in the database, the method may further comprise receiving credentials from the client device, sending the credentials to an access controller, receiving an authentication signal from the access controller, and granting network access for the client device if the authentication signal approves the client device, or else denying network access for the client device.

In some arrangements the method may further comprise requesting credentials from the client device if the identifying information is not authenticated in the database. The authentication signal may comprise an updated database of approved client devices. The authentication signal may approve the client device by adding the identifying information of the client device in the updated database. The credentials may comprise user identification information, and the identifying information may comprise a media access control (MAC) address.

Granting network access for the client device may include routing a network access request to a network link, and denying network access for the client device may include routing any network access request originating from the client device to the access controller until the authentication signal approves the client device.

In yet another exemplary embodiment, a method of network authentication in a computer network is provided. The method may comprise determining that a client device is not authorized for access to a network, receiving credentials from the client device, sending the credentials to an access controller, receiving an authentication signal from the access controller, and granting network access for the client device if the authentication signal approves the client device, or else denying network access for the client device.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures, systems, and processes for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
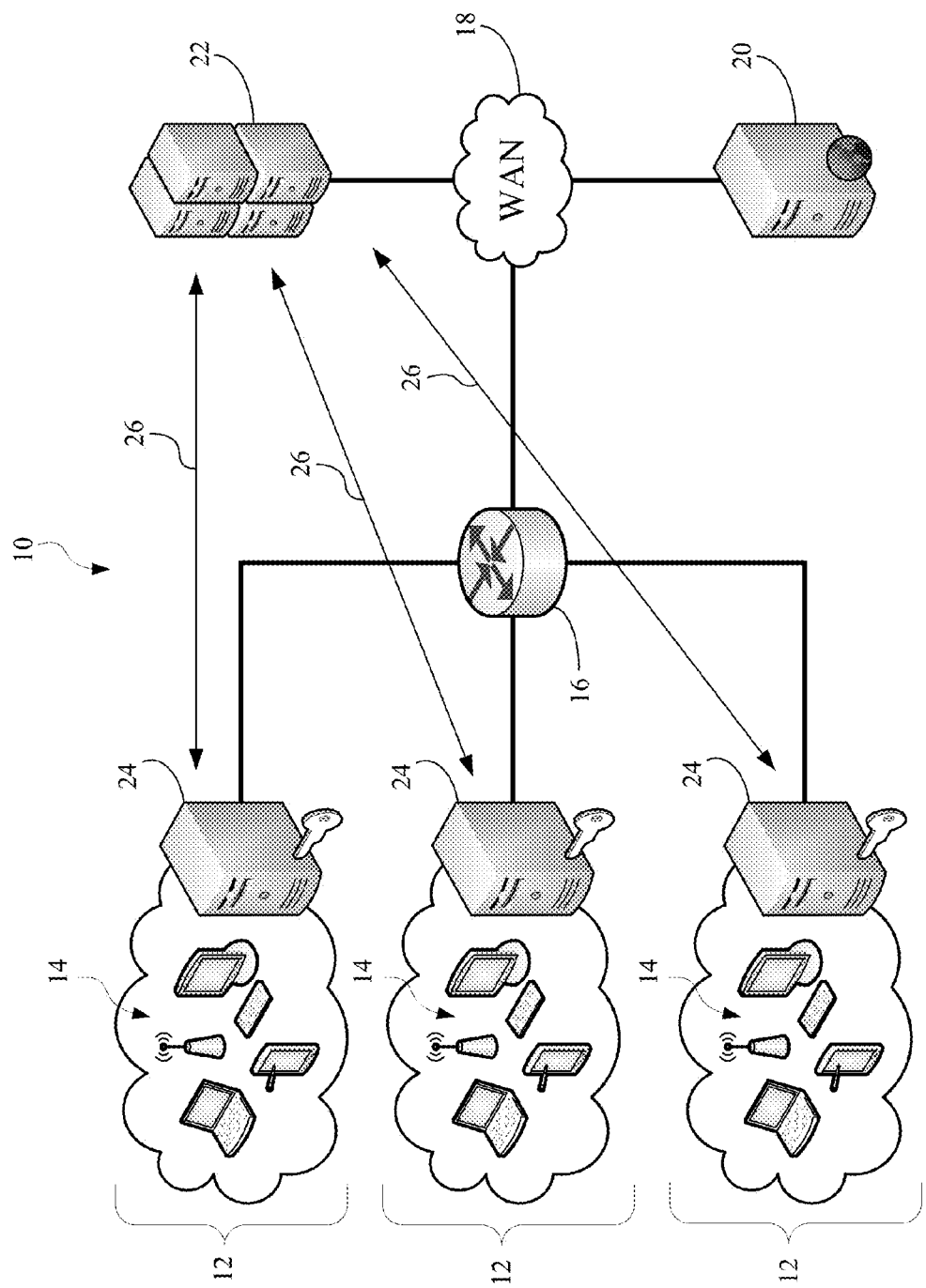
FIG. 1 is a block diagram of a device authentication network according to an embodiment of the prior art.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The apparatuses, systems, methods described herein relate to network access control systems and methods, including Internet access management computer systems and methods. In an exemplary embodiment, a network access controller is configured to communicate with an authentication, authorization, and accounting (AAA) server managing access to a network link. For example, the AAA server may be a Remote Authentication Dial-In User Service (RADIUS) server. The access controller is connected to a subnetwork of client devices via one or more intermediate relay node that allows the client devices to communicate with the access controller and the network link. Multiple subnetworks may be connected to one access controller, with each subnetwork being managed by an intermediate relay node. Thus, the access controller is not required to manage both a control path and data path for each subnetwork, since that load is borne by the intermediate relay nodes. Instead, the access controller only manages control path traffic directed to it by the intermediate relay nodes, the AAA server, and, potentially, a web server (e.g., a captive portal).

When a client device requests network access, identifying information about the device or user (such as user or device credentials) are referenced by the intermediate relay node and routed to a web server or to the access controller depending on whether or not the device is authorized for network access. In this manner, the burden of authenticating a large number of client devices' network requests is distributed across multiple relay nodes, and only unauthenticated devices are directed to communicate with the access controller. This reduces the overall load on the access controller, and allows it to more gracefully scale in managing traffic in a control path as the size of the network increases.

Embodiments disclosed herein may separate control paths and data paths of information through a network, thereby specializing hardware requirements on individual network communications equipment and increasing the speed in which an authenticated client device can connect to a network. These embodiments may also reduce the number of access controllers needed to manage network access, relieving hardware requirements for access controllers since they are not required to simultaneously function as routers.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring now to the figures in particular, FIG. 1 is a block diagram of a computer network 10. A plurality of subnetworks 12 comprising client devices 14 are distributed across the network 10. The subnetworks 12 each connect to the rest of the network via a router 16 to a wide area network (WAN) 18. The WAN 18 may provide network communication to a web server 20 and an AAA server 22 as a network link. The WAN 18 may also provide a connection to another network such as the Internet. Each subnetwork 12 of client devices 14 connects to the router 16 via a dedicated network access controller 24. The network access controllers 24 direct both data and control communications through the network to the WAN 18. The access controllers 24 may individually exchange information with the AAA server 22 for provisioning and accounting (as indicated by the arrows 26) for purposes of authenticating client devices 14.

When a client device 14 requests network access, the request is sent to the access controller 24 for the subnetwork 12 of the client device 14. The access controller 24 determines whether the client device 14 is authorized for network access. If it is not authorized, the unauthenticated client is redirected to the web server 20 (e.g., a captive portal) which requests user credentials from the client device 14. Upon receiving the credentials, the information is sent by the access controller 24 to the AAA server 22 for authentication. Once the credentials are authenticated, the access controller 24 grants network access to the device 14 (e.g., allows access to the WAN 18, the Internet, or other network). Each time the client 14 requests network access, the access controller 24 checks whether the client 14 is authenticated before granting network access. This feature increases the load on the access controller 24 and on the AAA server 22.

The information exchanged between the client device 14 and the WAN 18 may be referred to as traffic in the data path, and information sent between the client 14 and the web server 20 or AAA server 22 may be referred to as traffic in the control path. Both of these paths are managed by the access controller 24 for the subnetwork 12 in which the client device 14 is located, resulting in a need for robust and expensive access controller 24 hardware for each subnetwork 12. The access controller 24 also inefficiently checks authentication status for the client 14 in each network access request, resulting in slower network performance, among other complications.

Figure 2:
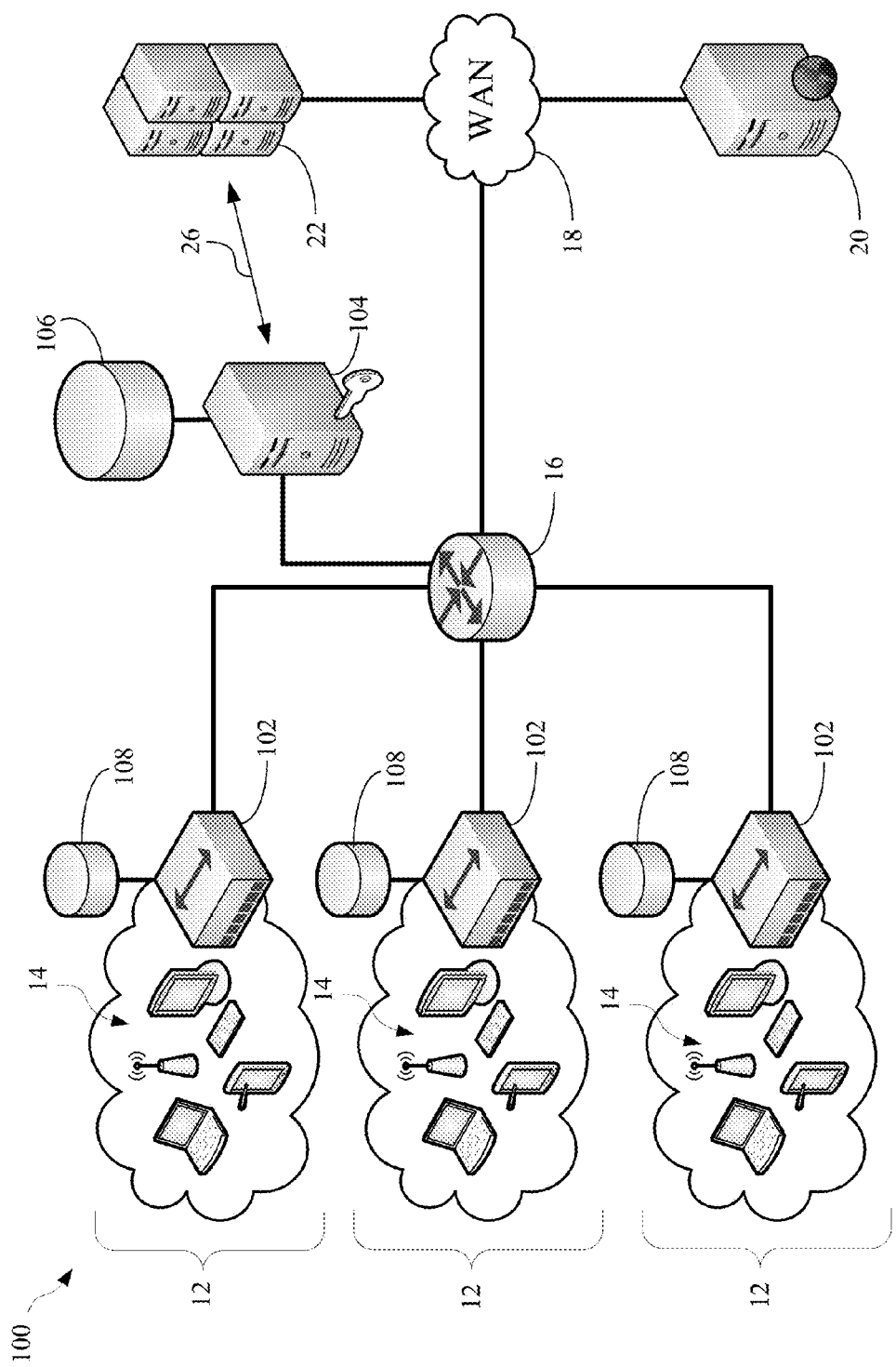
FIG. 2 is a block diagram of a device authentication network according to an embodiment of the present disclosure.

FIG. 2 is a block diagram of a computer network 100 according to an embodiment of the present systems and methods. The computer network 100 comprises a plurality of subnetworks 12 of client devices 14 distributed across the network 100. The subnetworks 12 each connect to the rest of the network 100 via a router 16 to a wide area network (WAN) 18. The WAN may provide network communication to a web server 20, an AAA server 22, and another network (e.g., the Internet). Each subnetwork 12 connects to the router 16 via an intermediate relay node 102. The intermediate relay nodes 102 direct data and control communications through the network to the WAN 18 or to a central access controller 104. The access controller 104 individually communicates with the AAA server 22 to determine authentication of the client devices 14 in each subnetwork 12. The access controller 104 may comprise or may be connected to a central data store 106, and each of the intermediate relay nodes 102 may comprise or may be connected to individual subnetwork data stores 108. The data stores 106, 108 may be used to store authenticated device information. For example, the data stores 106, 108 may store identifying information of client devices 14 or users that are authorized to access the WAN 18 along a data path. Each intermediate relay node 102 may have a separate data store 108 storing client device information for the subnetwork 12 with which it is associated.

The AAA server 22 may be a device for remotely managing access to network resources using access credentials. Thus, the AAA server 22 may comprise an authentication server and related devices and connections to perform its task. The web server 20 may comprise a computer operating a captive portal technique to use a web browser on a client device as an authentication device. Thus, when a client device is connected to the network and unauthenticated, packets may be intercepted until the user opens a browser on the device and authenticates his usage, makes a payment, or accepts an acceptable use policy. Upon authentication, the client device may have its MAC address (or other identifying information) used to bypass the authentication process by an intermediate relay node 102, as described in further detail below. The intermediate relay node 102 and access controller 104 may comprise a computing device such as a computer, router, or other computer networking apparatus used to receive, analyze, and redirect network communications (e.g., packets) from client devices or other network-attached devices. The intermediate relay node 102 or access controller 104 may comprise components to store information or access stored information (e.g., access a data store 106 or 108) and perform routing and computing functions based on the stored information.

Each intermediate relay node 102 may operate a relay agent which maintains the database (e.g., a list stored on data store 108) of authenticated clients. The database of authenticated clients may be maintained by the relay agent for the specific subnetwork 12 in which the intermediate relay node 102 is operating. This database may be updated or refreshed using an event-based mechanism or operation. For example, in some embodiments, when a client device 14 goes offline or comes online, the central list on the data store 108 of the access controller 104 may be updated, and the relay agent for the subnetwork 12 of the device 14 may be informed of its status by receiving an event from the central access controller 104. In some embodiments, the event may be a push of information from the access controller 104 to the relay agents to update their individual authentication lists. Upon receiving the event, the relay agent may request an updated list from the access controller 104. The access controller 104 may then send the list of authenticated clients corresponding to the subnetwork 12 in which the device is online to the relay agent for that subnetwork 12. Thus, each relay agent maintains a list of authenticated clients relevant to its subnetwork 12, and the database is updated in each event.

When the relay agent starts up on the intermediate relay node 102, it may register with the central access controller 104, which maintains a list of all relay agents that have been registered. Each of the relay agents may be assigned a unique identifier (e.g., ID number or name). Additionally, the central access controller 104 may maintain a list of media access control (MAC) addresses or other identifying information about all clients authenticated across all networks (e.g., subnetworks 12) it is serving. This information may be stored in a database in the central data store 106. A client list or database for a particular subnetwork 12 may be associated with the identifier of the relay agent associated with that subnetwork 12.

When a client device 14 tries to access the network, the relay agent running on the subnetwork 12 of the client device 14 reviews identifying information of the client device 14 (e.g., its MAC address) and determines whether the identifying information is in the database of authenticated devices maintained by the relay agent. For example, the relay agent may perform this check by inspecting the MAC address of a packet received from the client device 14 against a list of authorized MAC addresses stored in a data store 108. If the identifying information is in the database, the device's request (e.g., packet) may be routed by the intermediate node to the default router in the data path. If the client 14 is unauthenticated, every packet may be re-routed to the access controller 104 in the control path. The access controller 104, in coordination with a web server 20 (e.g., a captive portal) may then collect credential information from the client device 14. The credential information may include a username and password or another security key. The access controller 104 may then send the user credentials to the AAA server 22 for authentication.

Once authentication is verified by the AAA server, the access controller 104 may obtain the latest list of client identifying information which has been authenticated. The new database may be compared with its old database (e.g., one already stored in data store 106) to determine which clients have been added and which have been removed from the authenticated list. At this time, the access controller 104 may send an event to the relay agents on the relay nodes 102 that have had changes in the client devices 14 listed in their individual databases (e.g., new additions or removals). In some embodiments, the event notifies the relay agents to request a refreshed authenticated list from the access controller 104. In other embodiments, the refreshed list is automatically sent to the relay agents as part of the event. Thus, each relay agent maintains a list of authenticated client devices 14 for the subnetwork 12 it serves.

Using this exemplary network configuration, the control path and data path for client devices 14 through the network 100 is separated, and a dedicated access controller is not required for each subnetwork 12. One access controller 104 may be sufficient to handle requests from multiple networks. The access controller 104 is also not required to perform routing functions and may therefore be dedicated to authentication tasks outside the data paths of the relay nodes 102. This may reduce hardware requirements or at least allow the hardware for the access controller 104 to be specialized for the primary task of managing authentication in cooperation with the AAA server 22 and web server 20. Furthermore, since authenticated client devices 14 are known locally to each relay agent at each relay node 102, the decision for granting network access is distributed to the relay nodes 102 instead of all requests being confirmed with the AAA server 22. Therefore, network access is more responsive for client devices 14 since requests are not being repeatedly relayed to the AAA server 22 by the access controller for authentication.

Figure 3:
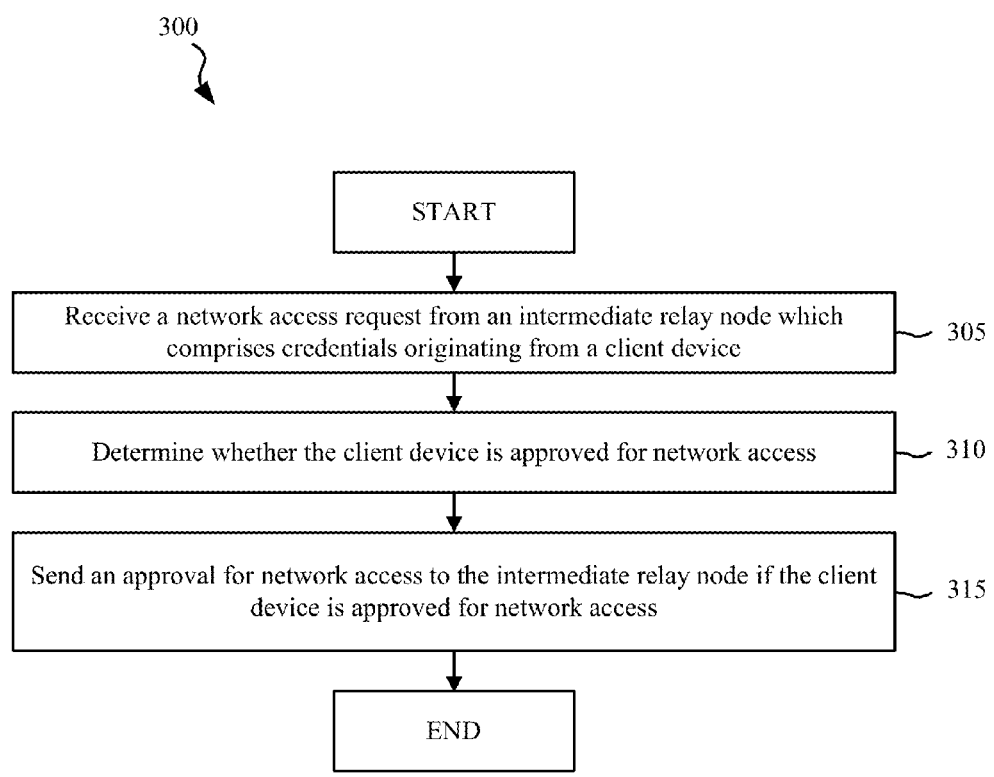
FIGS. 3-8 are flow diagrams of processes by which computing devices may manage computer network authentication according to embodiments of the present disclosure.

Additional detail and other features and advantages of embodiments of the present disclosure are set forth in connection with the flow diagrams of FIGS. 3-8. Turning specifically to FIG. 3, a flowchart of a process 300 for managing a computer network is shown. The process 300 may be performed by a computing device in a computer network, such as a network access controller 104. The process 300 begins at block 305 where the computing device receives a network access request from an intermediate relay node which comprises credentials originating from a client device. The intermediate relay node may be intermediate relay node 102 described above, and the client device may be a client device 14 in a subnetwork 12 described above. The network access request maybe, for example, a packet sent from the client device indicating intent to access the network, such as requesting information from the network (e.g., a file or website) or requesting authentication from the computing device. The credentials may comprise client device indicating information (e.g., a MAC address or serial number) or security/authentication related information (e.g., a username and password, network access key, security PIN, etc.). In some embodiments, the credentials may comprise an indication that the user of the client device has accepted prescribed terms and conditions of network access. The network access request is forwarded to the computing device by the intermediate relay node and is not received directly from the client device. Thus, in these embodiments the user or device credentials originate from the client device, not an intermediate relay node or other network node. More detailed examples of how an intermediate relay node may control forwarding of a network access request are set forth in FIGS. 6-8 and their descriptions, infra.

In block 310, the computing device determines whether the client device is approved for network access. This may be done in a variety of ways, such as by communicating with an AAA server (see also FIG. 4) or by referencing a database of client devices or credentials (see also FIG. 5).

In block 315, the computing device sends an approval for network access to the intermediate relay node if the client device is approved for network access. Sending an approval for network access may comprise sending data such as a packet of information to the intermediate relay node. The data may comprise instructions to the intermediate relay node to allow network access for the client device. In some embodiments, sending an approval may comprise sending information from a database (e.g., stored in a data store 108 at an access controller 104) to the intermediate relay node. After receiving the approval for network access, the intermediate relay node may manage network access for the client device independent of the computing device (e.g., access controller) unless directed to deny access at a later time or after receiving subsequent instructions to deny access from the computing device. Therefore, network access requests from the client device may not need to be subsequently forwarded to the computing device to ensure authenticated access to the network for the client device.

In some embodiments, the computing device may initially receive a network access request from an intermediate relay node without including credentials. The computing device may then send a request to the client device (or to the intermediate relay node serving the client device) to gather user credentials. In some cases the computing device may therefore direct the client device to a web server (e.g., web server 20) such as a captive portal to collect the requisite credentials. A network access request originating from the client device may then be received by the computing device based on the credentials collected, as set forth in block 305. Alternatively, the credentials may be forwarded to the computing device apart from a network access request from the intermediate relay node after they are collected via the web server. In either case, the client device forwards information to the computing device via the intermediate relay node.

Figure 4:
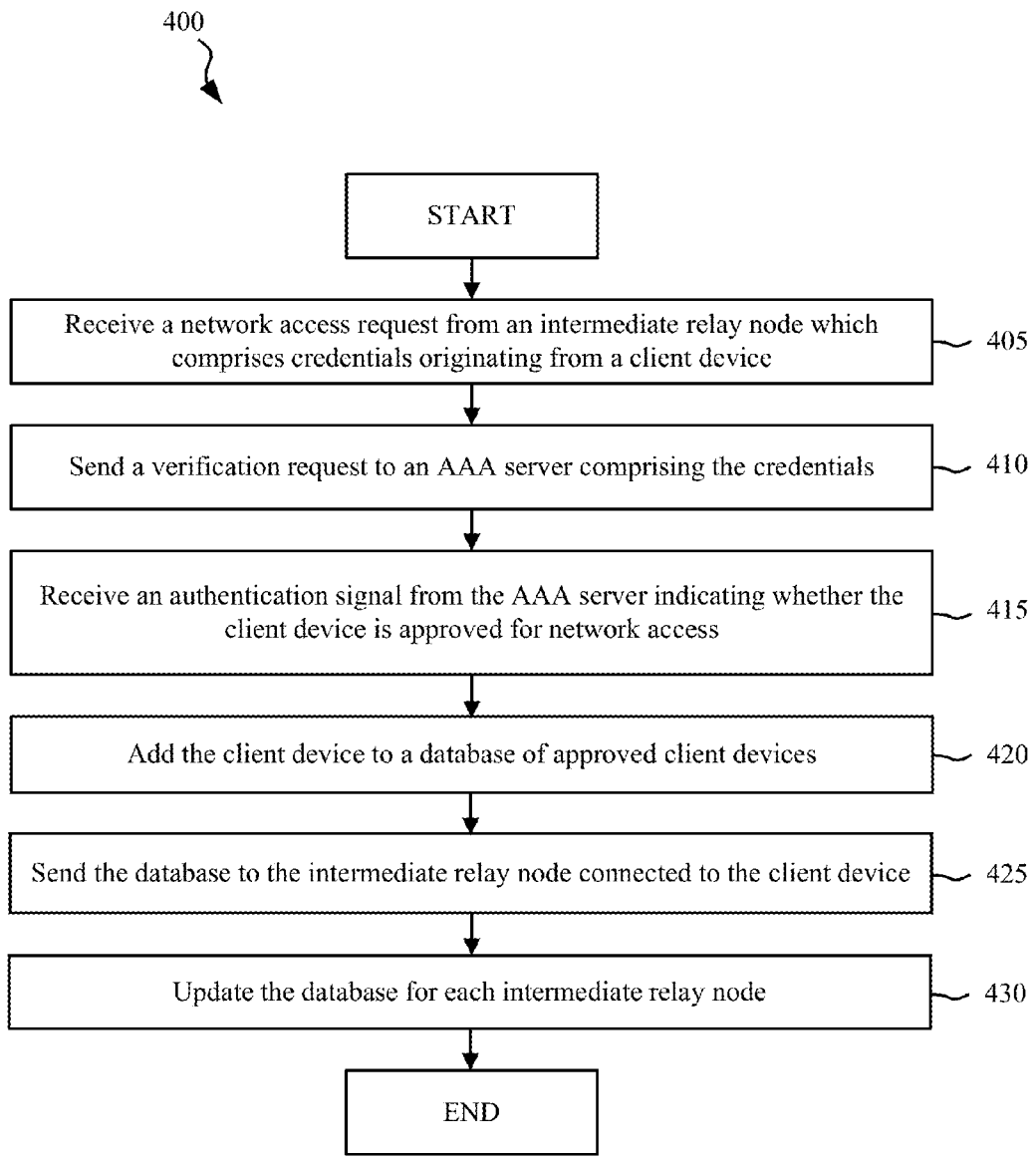

FIG. 4 is a flow diagram of a process 400 by which a computing device (e.g., access controller 104) may manage computer network authentication. In block 405, the computing device may receive a network access request from an intermediate relay node. The network access request may comprise credentials originating from a client device. Thus, block 405 may be performed in the manner described in connection with block 305 above. In block 410, the computing device may send a verification request to an AAA server comprising the credentials. The verification request may comprise instructions or information for the AAA server to determine whether the client device should be authenticated for network access. Sending the verification request may comprise submitting a packet to the AAA server of the credentials (e.g., a username and password, device identifier, location of the client device, or other relevant information needed by the AAA server). The packet may be encrypted by the computing device to secure the information transferred. The AAA server may be AAA server 22 or a RADIUS server. In block 415, the computing device may receive an authentication signal from the AAA server indicating whether the client device is approved for network access. The authentication signal may comprise instructions to update a database or list of approved client devices by adding or removing one or more client devices from the database. In some embodiments, the authentication signal may comprise data for only the client device for which verification is requested in block 410.

If the client device is not approved for network access, the computing device may send an update to the client device regarding its unauthorized status via the intermediate relay node. Alternatively, the computing device may allow the client device to retry authentication by requesting new credentials. The computing device may also send an event to the intermediate relay nodes in the network to remove the client device and/or its associated credentials from their databases of approved client devices. Additionally, the computing device may remove the client device from its own database of approved client devices.

If the client device is approved for network access, in block 420 the computing device may add the client device (or an identifier or associated credentials therefor) to a database of approved client devices. The database may be a database associated with the computing device (e.g., a database stored in data store 108) or a database associated with the intermediate relay node connected to the client device which may be stored with the computing device.

In block 425, the computing device may send the database to the intermediate relay node connected to the client device. This action may further comprise sending information to the intermediate relay node with an instruction to request a new database of approved client devices and/or receiving a request from the intermediate relay node to send a new database of approved devices. The database sent to the intermediate relay node may comprise a database of approved devices in the entire network or the subnetwork. In some arrangements, the database may only comprise approval information for the client device from which the network access request is received in block 405. The database sent in block 425 may further comprise instructions to the intermediate relay node, such as instructions to request another update to its database under a set of conditions. For example, the instructions may direct the intermediate relay node to request another update after a predetermined span of time or upon receiving another network access request from a different client device. In another example, if the client device of block 405 is not approved for network access, the instructions may direct the intermediate relay node to request an updated database when the unauthorized client device makes another network access request, thereby allowing the client device to more quickly be added to the database and recognized by the intermediate relay node.

In some embodiments the computing device may also perform optional block 430, wherein the computing device updates the database for each intermediate relay node or for each subnetwork in the network of the computing device. This additional action causes changes in the databases of subnetworks to propagate quickly and may improve responsiveness of network access in areas where many changes to the database are made. For example, when many client devices are granted network access temporarily, such as in an airport terminal or hotel, it may be beneficial to update all databases frequently. Furthermore, if a client device moves from one subnetwork to another (e.g., a mobile device/ smartphone), it may be beneficial to distribute a database to all likely intermediate relay nodes to which the client device may connect so as to reduce the need for repeating authentication for the same device many times. Other changes to the approval status of various devices may occur without those devices being connected to the network, so by distributing and updating databases periodically or upon a change to one of the databases, the overall network may stay up-to-date more regularly.

Figure 5:
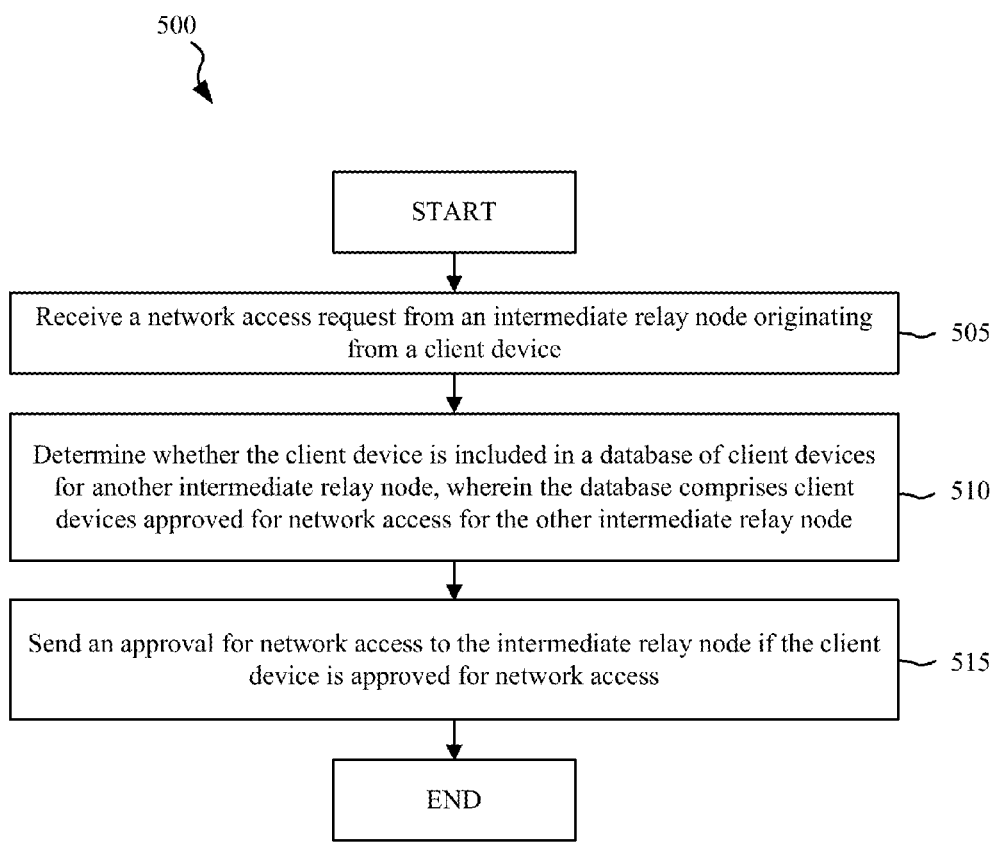

FIG. 5 is a flow chart depicting a process 500 by which a computing device may administer a computer network. In block 505, the computing device receives a network access request from an intermediate relay node originating from a client device. This block is performed similar to blocks 305 and 405 above. As discussed above, the network access request may not necessarily be accompanied by credentials from the client device or user. However, credentials may also be included in block 505.

In block 510, the computing device determines whether the client device is included in a database of client devices for another intermediate relay node. This database comprises client devices approved for network access in the subnetwork of the other intermediate relay node. Thus, rather than directing an authentication request to an AAA server (or in addition thereto), the computing device may attempt to determine authentication of the client device by referencing another intermediate relay node's database of approved devices. This may be beneficial if the computing device performs an action similar to that described above in connection with block 430, since the device may be included in another subnetwork's database and connection to the AAA server may therefore not be necessary. In order to determine whether the client device is included in another database, the computing device may initiate communication with the other database's intermediate relay node or may access the other database if it is stored by a data store connected to the computing device (e.g., data store 108).

In block 515, the computing device sends an approval for network access to the intermediate relay node if the client device is approved for network access. In some other embodiments, the computing device may send a denial of network access notification to the intermediate relay node if the client device is not authorized for network access. Block 515 may be performed in the manner described above in connection with block 315.

Figure 6:
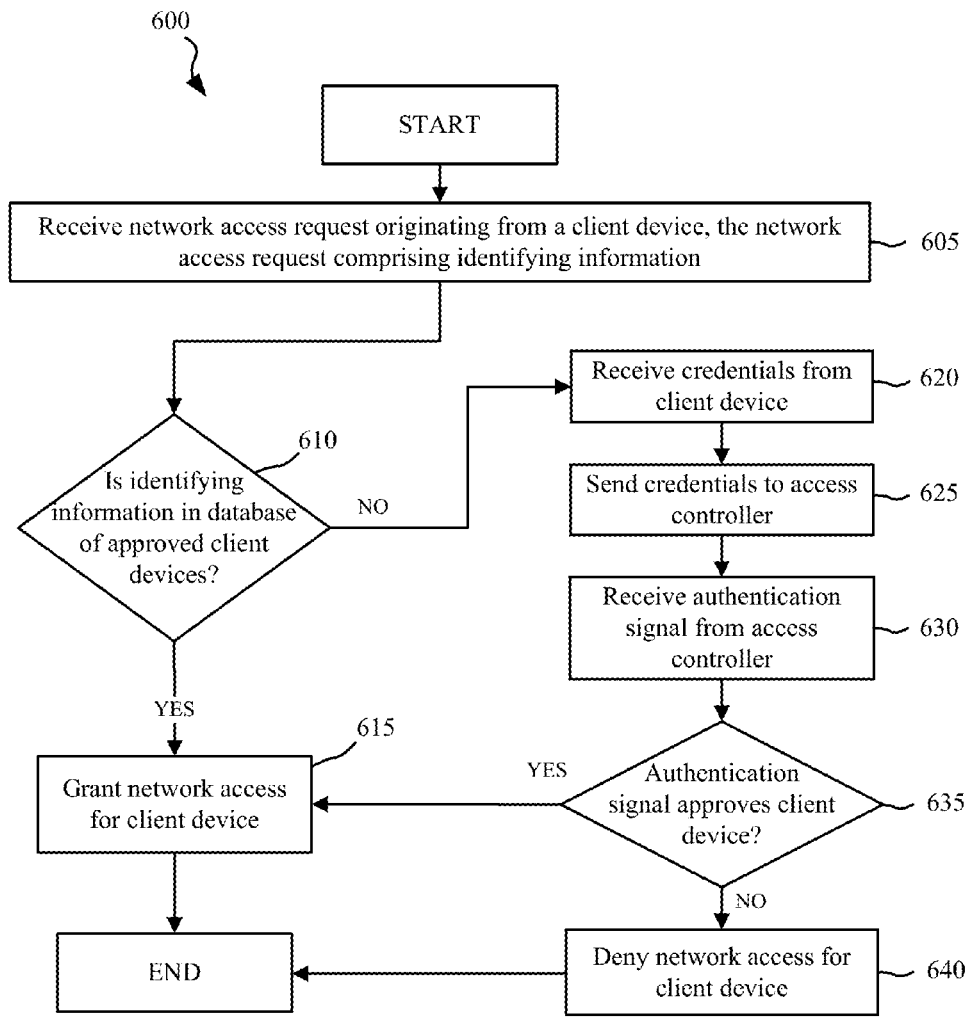

FIG. 6 is a flow diagram depicting a process 600 by which a computing device may administer authentication in a computer network. In the flow diagrams of FIGS. 6-8, the computing device may be an intermediate relay node such as intermediate relay node 102 of FIG. 2. In block 605, the computing device may receive a network access request originating from a client device. The network access request may comprise identifying information about the client device. For example, the network access request may be a packet having the MAC address of the client device encoded therein. The network access request may originate from the client device, meaning the network access request may be created by the client device. The network access request may be forwarded to the computing device via another device, such as, for example, a router linked to the client device and the computing device.

In some embodiments, the identifying information may comprise credentials including preauthentication information and/or routing information. Preauthentication information may allow a device to connect to a network without repeatedly requesting credential or device identification information from a user. For example, a user may subscribe to a network connection service under a service agreement that allows the user to connect to certain networks, so the routers or intermediate relay nodes (e.g., nodes 102) may recognize that the device is preauthenticated for network access after the user subscribes. These routers or nodes may operate using a protocol such as WI-FI CERTIFIED PASSPOINT®, WI-FI ALLIANCE HOTSPOT 2.0 SPECIFICATION, and/or IEEE 802.11u which may allow automation of the exchange and authentication of user credentials. The routers or nodes may thus similarly include cellular transceiver stations which allow access to devices that have been preauthorized and preauthenticated for access to the network.

In some embodiments, the device may be preauthorized for two or more available networks or subnetworks, and the device may be configured to select a preferred network or subnetwork automatically. This may be referred to as routing information. Alternatively, a node (e.g., nodes 102) may detect that a device is capable of connecting to another preferred network and may prompt the user to connect to the preferred network, prevent access to the network of the node so that the device automatically connects to the preferred network, forward packet information to the preferred network (such as if the node is capable of routing traffic to two different destination networks), or otherwise cause network traffic to go to the preferred network. A preferred network may be, for example, a preferred service provider, a network with preferred performance characteristics, a network with preferred security features, or other network with preferable characteristics.

By using the identifying information in this way, the node may data offload one network with instant network detection, selection and authentication. These capabilities also may allow access to venues in which the device or user have never previously connected, thereby increasing customer satisfaction. Using a protocol such as PASSPOINT® (or similar), user data and identifying information may be secured using Wi-Fi Protected Access (WPA) (or another comparable security protocol, such as, for example, WPA2), whether the device uses a SIM or not.

In block 610, the computing device may determine whether the identifying information of the network access request is in a database of approved client devices. For example, the computing device may determine whether a provided MAC address is included in a list of approved client devices for a network or subnetwork to which the computing device is connected. The list of approved devices may be stored in a database associated with the computing device, such as, for example, a data store 106. If the information is included in the database and the client device is approved for network access, the computing device immediately grants network access to the client device along the data path in the network, as shown in block 615. In some embodiments, the database may comprise a list of both authenticated devices and unauthenticated devices, in which case the computing device determines whether the client device is among the authenticated devices in block 610.

If the identifying information is not in the database of approved client devices, the computing device performs block 620, where credentials are received from the client device. In some embodiments, the credentials may be prompted or requested by the computing device before performance of block 620. See also FIG. 7. The credentials may comprise a username, password, device key, security key, PIN, or other user- or device-identifying piece of information sent from the client device. In some embodiments, the credentials may be sent from another device, such as, for example, from a smartphone (i.e., when two-factor authentication is implemented).

In block 625, the computing device sends the credentials to an access controller. The access controller may be access controller 104 of FIG. 2. The access controller may be configured in a control path of the network and configured to determine authentication of a client device to access the network in connection with a web server and an AAA server.

After processing by the access controller, the computing device may receive an authentication signal from the access controller in block 630. The authentication signal may comprise an event instructing the computing device to request and update the database of approved client devices (mentioned in connection with block 610). In some embodiments, the authentication signal may comprise an updated database which is pushed to the computing device from the access controller. See also FIG. 7. In another embodiment, the authentication signal may comprise data instructing the computing device to simply allow or deny the client access to the network.

The computing device thereafter determines whether the authentication signal approves the client device for network access in block 635. If so, the client device is granted network access, as shown in block 615. In not, the client device is denied access, as shown in block 640.

Figure 7:
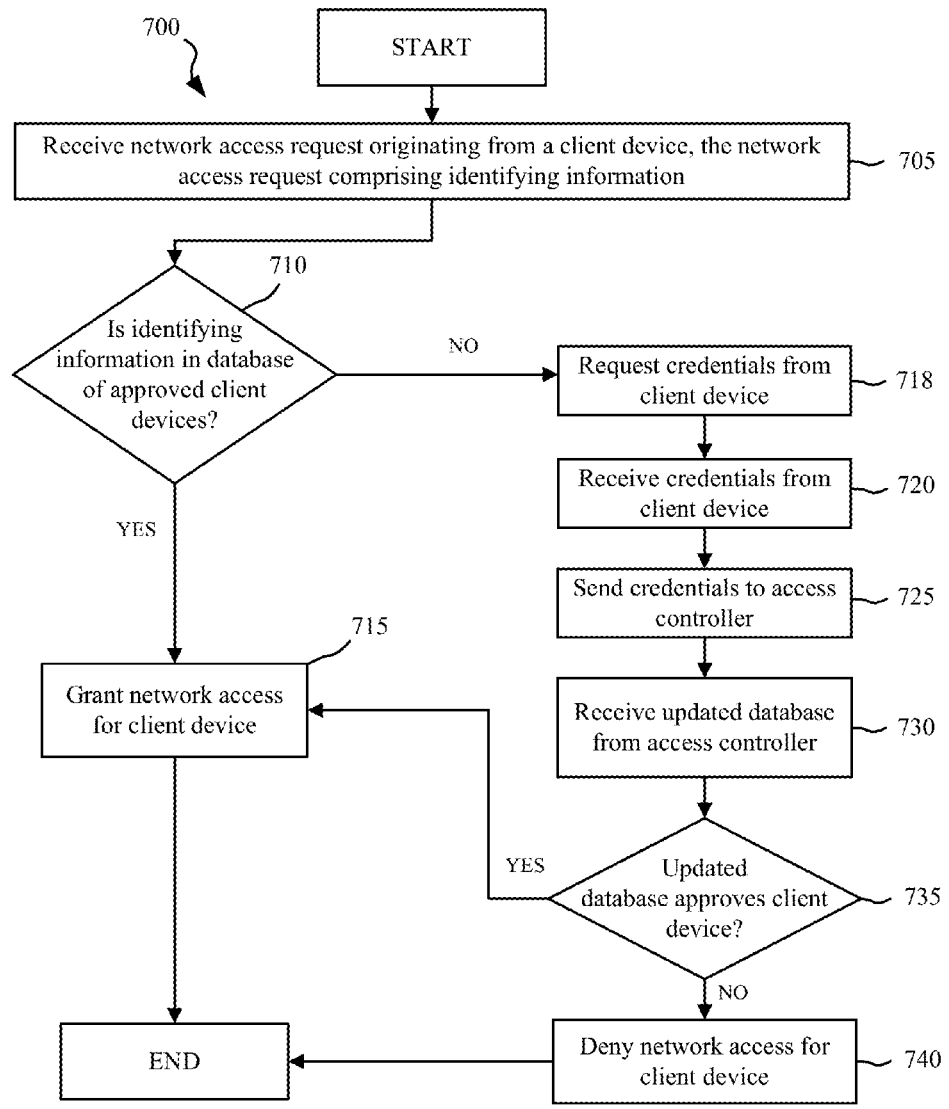

FIG. 7 is a flow diagram of another process 700 by which a computing device may manage a computer network. In block 705, the computing device may receive a network access request originating from a client device. The network access request may comprise identifying information about the user or the device, as described above in connection with block 605.

In block 710, the computing device may determine whether the identifying information is in a database of approved client devices, similar to block 610. If the device is in the database, the computing device may then immediately grant network access to the client device in block 715, similar to block 615 above. If the client device is not in the database, the computing device may then request credentials from the client device in block 718. The request for credentials may include redirecting the client device to a web server (e.g., captive portal) to input credentials such as a username and password. Upon receiving the credentials, they may be then forwarded from the web server or the client device to the computing device in block 720. In another embodiment, the computing device may request the credentials from the client device without use of a web server. The request for client device credentials may require input from a user, or may comprise performing an automated security confirmation algorithm wherein the client device is authenticated by confirming identifying information about the client device remotely by the computing device, such as by detecting a security device on the client device. The detection of the credentials may comprise the performance of block 720.

In block 720, the computing device may receive credentials from the client device as described above and as described in connection with block 620. In block 725, the computing device may send the credentials to an access controller for the network, as described above in connection with block 625.

In block 730, the computing device may receive an updated database for the access controller. The database may include at least a list of client devices, their identifying information (e.g., MAC addresses or device names), and/or information about approved users. The identifying information or other information may be information that is embedded in or sent by the client device with network access requests. Thus, in subsequent performance of block 710, the computing device may automatically recognize that the device is approved for network access without requesting credentials or confirming them with an access controller. The database may also include additional information about client devices or users that are denied network access, information about how long client devices are to be granted or denied network access, and other related information. In some embodiments, the database may comprise or be accompanied by instructions to fetch or request an updated database at a later time.

If the computing device determines that the database approves the client device, the computing device grants access in connection with block 715. If not, the client device is denied access in block 740.

In some embodiments, the computing device may further interact with the client device, such as by returning to block 710 to attempt to grant access to the client device a second time. In other embodiments, the computing device may also send a message to the client device comprising its status (e.g., access granted or denied) and information about the network access (e.g., time remaining, data limit remaining, any other restrictions on network activity, etc.).

Figure 8:
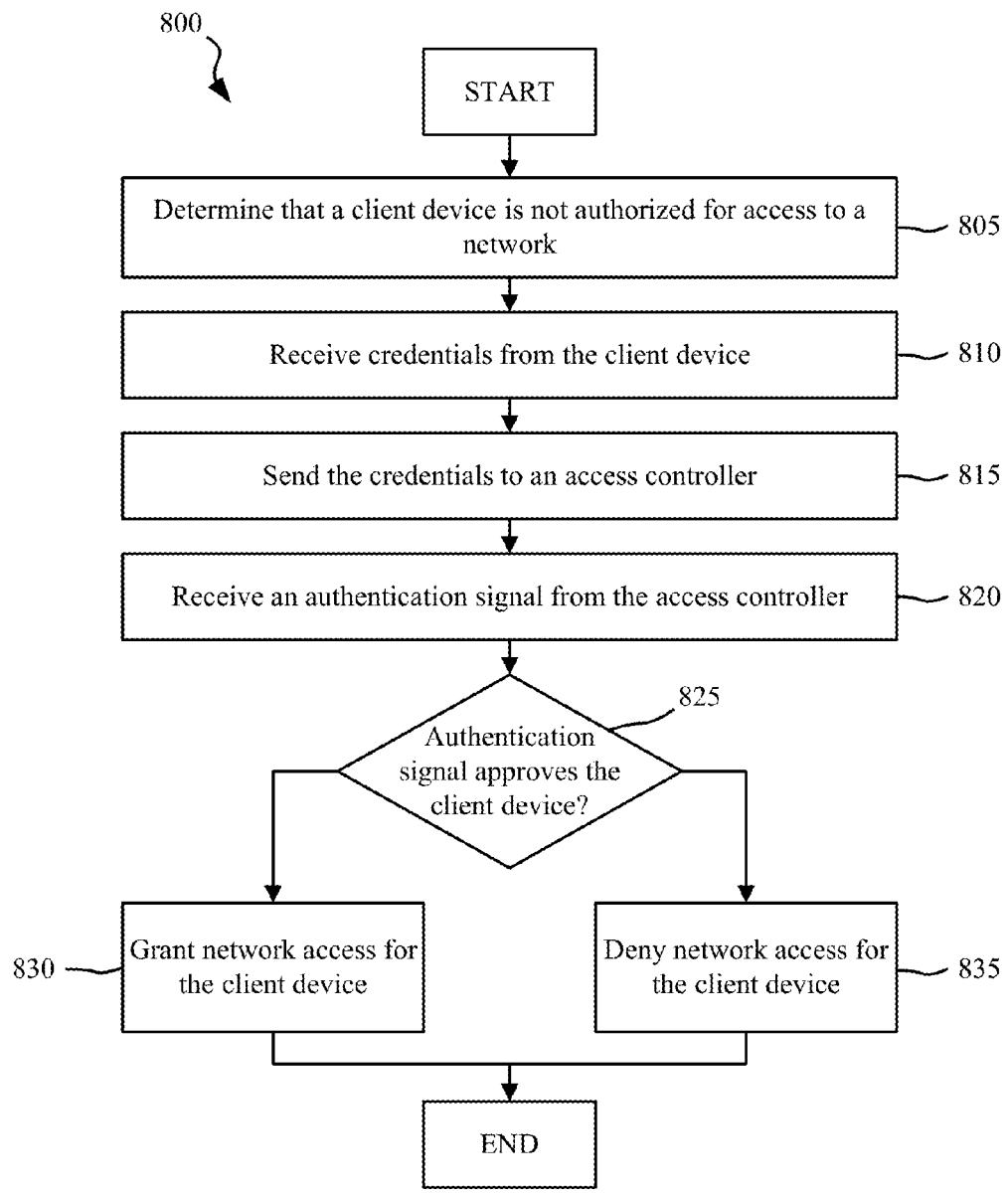

FIG. 8 is a flow diagram of another process 800 that may be performed by a computing device to manage a computer network. This process 800 shows an embodiment where the computing device starts off knowing that the client device is not authorized for access. Thus, this process 800 may be beneficially implemented in networks where new users are never initially authorized, such as in a workplace or other setting with a need for security. The process begins at block 805, where the computing device determines that a client device is not authorized for access to the network. Next, in block 810, the computing device may receive credentials from the client device. In block 815, the computing device may send the credentials to an access controller, and then receive an authentication signal from the access controller in block 820. At block 825, the computing device may determine whether the authentication signal approves the client device, and if the client device is authenticated, may grant access in block 830, or may deny access in block 835 if the client device is not authenticated.

Figure 9:
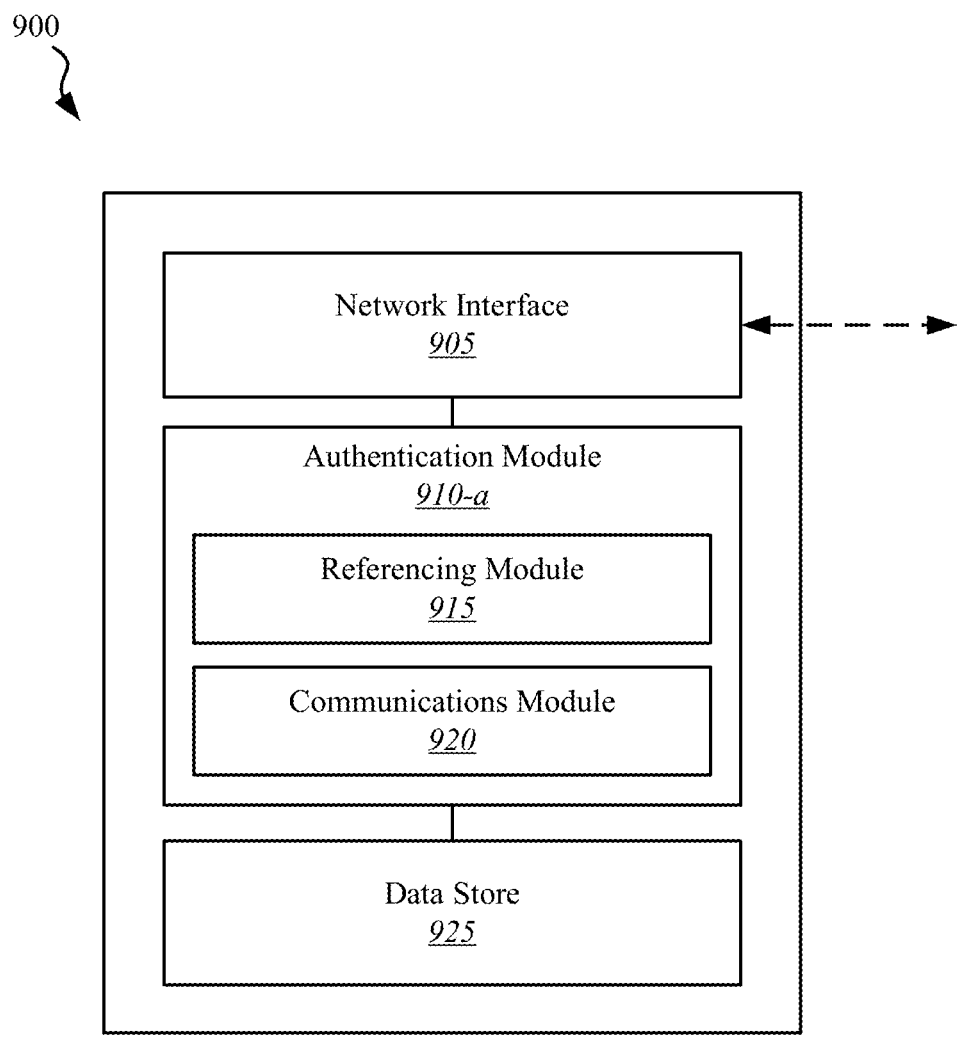
FIG. 9 is a block diagram of a computing device suitable for implementing embodiments of the present disclosure.

FIG. 9 is a block diagram of a computing device 900 according to embodiments of the present disclosure. For instance, the computing device 900 may be a computing device described above in connection with FIGS. 3-8, an intermediate relay node 102, or an access controller 104. The function of various parts of the computing device 900 may appropriately vary based on the task in which the computing device is used. In some embodiments, the computing device is a computer, a server, a handheld computing device, a router, a network hub, or another network-connected device. The computing device 900 may comprise a network interface 905. The network interface 905 may provide two-way network communications between the computing device 900 and other devices, such as, for example, a client device 14, an intermediate relay node 102, an access controller 104, or an AAA server 22. Thus, the network interface 905 may comprise an Ethernet or IEEE 802.1X-series (e.g., Wi-Fi) connection interface, among other known networking communication standards.

The computing device 900 may further include an authentication module 910-a. The authentication module 910-a may be configured to electronically communicate with the network interface 905 and other components of the computing device 900 to process and make decisions regarding the routing of traffic received from the network interface 905 and whether to grant network access based at least in part on the signals received from the network interface 905. Therefore, the authentication module 910-a may comprise a referencing module 915 and a communication module 920. The authentication module 910-a may be stored or encoded on a memory or disk and may be implemented by a processor. See also FIG. 10 and related description infra.

The referencing module 915 may comprise instructions and algorithms for interfacing with a data store 925 connected to the computing device 900 containing an index or database of client devices approved for network access in one or more subnetworks in which the computing device 900 operates. For example, this data store 925 may be data store 106 or 108 described above which store databases of authenticated client devices for subnetworks 12. The referencing module 915 may further comprise instructions or a topology for reading the authenticated list in the data store 925 and determining whether a specific client device is authenticated for network access. In some embodiments, the referencing module 915 may also be enabled to modify the information in the data store 925, such as by adding or removing client devices from the authenticated database.

The authentication module 910-*a* may also comprise a communications module 920. The communications module 920 may comprise instructions or circuitry for interacting with other devices via the network interface 905. For example, the communications module 920 may be adapted to communicate with a client device or an intermediate relay node to gather user or device credentials. The communications module 920 may also then communicate with the client device regarding its network authentication status or may communicate with an intermediate relay node to update a database of approved client devices. In some embodiments, such as when the computing device 900 is an access controller, the communications module 920 may communicate with a web server or AAA server to determine whether to authenticate a client device in a network or subnetwork. Therefore, in some configurations, the authentication module 910-*a* may be used to perform one or more of the processes 300, 400, 500, 600, 700, and 800 described previously herein.

Figure 10:
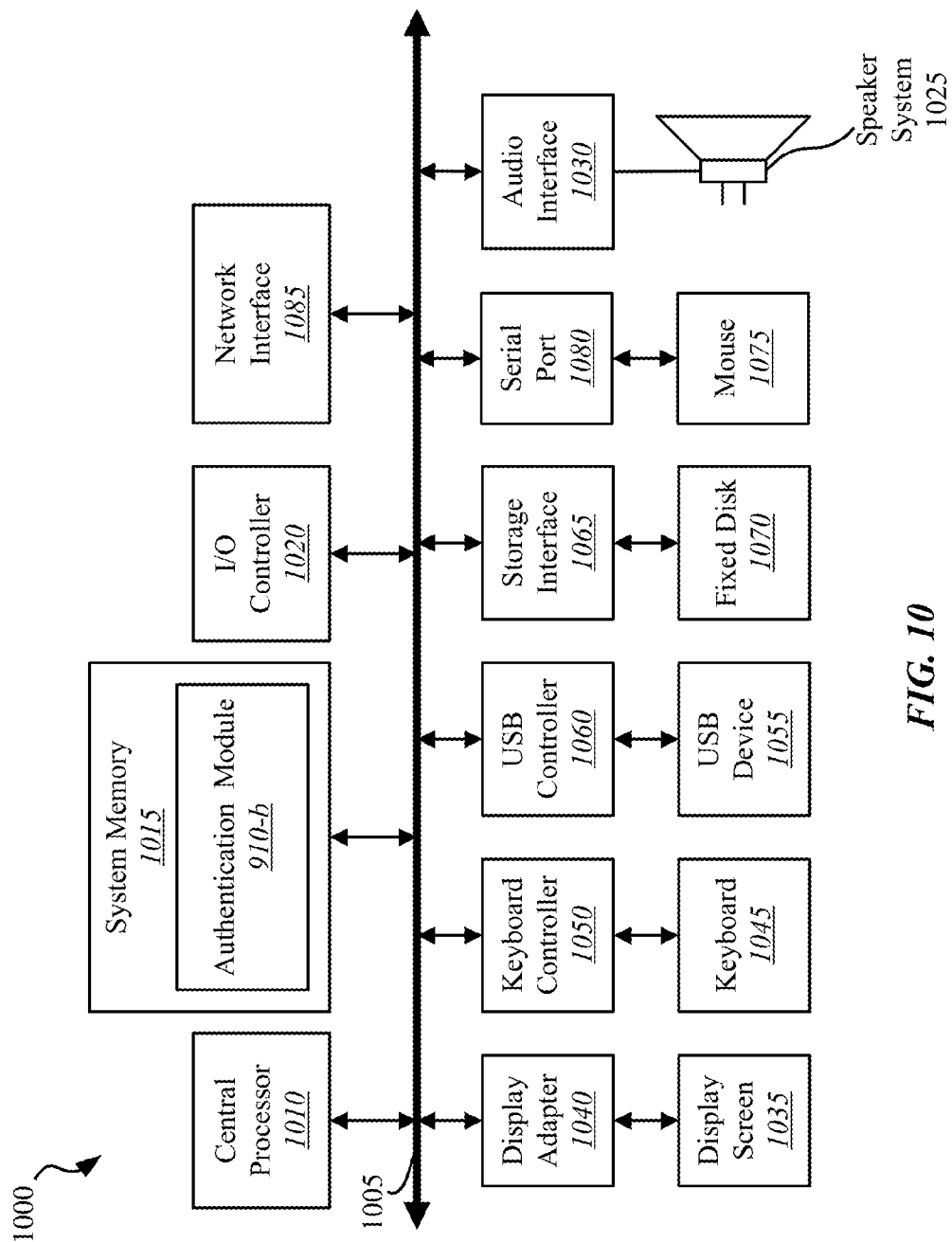
FIG. 10 depicts a block diagram of a computer system suitable for implementation of various embodiment of the present systems and methods.

FIG. 10 depicts a block diagram of a computer system 1000 suitable for implementing the present systems and methods. Computer system 1000 includes a bus 1005 which interconnects major subsystems of computer system 1000, such as a central processor 1010, a system memory 1015 (typically RAM, but which may also include ROM, flash RAM, or the like), an input/output controller 1020, an external audio device, such as a speaker system 1025 via an audio output interface 1030, an external device, such as a display screen 1035 via display adapter 1040, one or more serial port 1080, a keyboard 1045 (interfaced with a keyboard controller 1050), one or more universal serial bus (USB) device 1055 (interfaced with a USB controller 1060), and a storage interface 1065 linking to a fixed disk 1070. Also included are a mouse 1075 (or other point-and-click device, coupled to bus 1005 via serial port 1080) and a network interface 1085 (coupled directly to bus 1005).

Bus 1005 allows data communication between central processor 1010 and system memory 1015, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, an authentication module 910-*b* which may implement the present systems and methods may be stored within the system memory 1015. Applications resident with computer system 1000 are generally stored on and accessed via a non-transitory computer readable medium, such as a hard disk drive (e.g., fixed disk 1070), an optical drive (e.g., an optical drive that is part of a USB device 1055 or that connects to storage interface 1065), or other storage medium. Additionally, applications can be in the form of electronic signals modulated in accordance with the application and data communication technology when accessed via network interface 1085.

Storage interface 1065, as with the other storage interfaces of computer system 1000, can connect to a standard computer readable medium for storage and/or retrieval of information, such as a fixed disk drive 1070. Fixed disk drive 1070 may be a part of computer system 1000 or may be separate and accessed through other interface systems as a data store (e.g., data stores 106 or 108 of FIG. 2). A modem connected to the network interface 1085 may provide a direct connection to a remote server via a telephone link or to the Internet via an internet service provider (ISP). Network interface 1085 may provide a direct connection to a remote server via a direct network link to the Internet via a POP (point of presence). Network interface 1085 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present systems and methods. The devices and subsystems can be interconnected in different ways from that shown in FIG. 10. The operation of a computer system such as that shown in FIG. 10 is readily known in the art and is not discussed in detail in this application. Code to implement the present disclosure can be stored in a non-transitory computer-readable medium such as one or more of system memory 1015, or fixed disk 1070. The operating system provided on computer system 1000 may be MS-DOS®, MS-WIN-DOWS®, OS/2®, UNIX®, Linux®, or another known operating system.

Moreover, regarding the signals and network communications described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiments are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer system for authenticating and managing network traffic, the system comprising:
    a network link providing a connection to a network;
    an authentication, authorization, and accounting (AAA) server configured to provide AAA management for the network link;
    an access controller configured to communicate with the AAA server and to control access to the network link; and
    at least one intermediate relay node to route a request from a client device by managing a control path and a data path for a first subnetwork of one or more client device;
    wherein when the at least one intermediate relay node determines the client device of the first subnetwork is not listed in an authentication database as an authenticated client device, the at least one intermediate relay node routing the request from the client device to the access controller through the control path instead of the data path.

2. The computer system of claim 1, wherein traffic in the control path includes information exchanged between the client device and the AAA server; information exchanged between the client device and a web server; or information exchanged between the client device and the AAA server and information exchanged between the client device and the web server; and wherein traffic in the data path includes information exchanged between the client device and a wide area network (WAN), the network link comprising the WAN.

3. The computer system of claim 2, wherein when a client device of the first subnetwork of client devices requests network access, the at least one intermediate relay node determines whether the client device is authenticated.

4. The computer system of claim 3, wherein the at least one intermediate relay node determining whether the client device is authenticated comprises the at least one intermediate relay node receiving identifying information from the client device and determining whether the identifying information from the client device matches an entry in an authentication database.

5. The computer system of claim 4, wherein when the at least one intermediate relay node determines the identifying information from the client device matches the entry in the authentication database, the at least one intermediate relay node routes the request from the client device to a default router in the data path.

6. The computer system of claim 5, wherein the client device accesses the WAN via a connection between the at least one intermediate relay node and the default router.

7. The computer system of claim 5, wherein the access controller connects to the first subnetwork of client devices through the default router.

8. The computer system of claim 4, wherein after receiving the request of the client device from the at least one intermediate relay node the access controller, in conjunction with the web server, to collect credential information from the client device and to send the collected credential information to the AAA server for authentication.

9. The computer system of claim 4, wherein the identifying information of the client device comprises a media access control (MAC) address.

10. The computer system of claim 1, wherein the AAA server includes a Remote Authentication Dial In User Service (RADIUS) server.

11. The computer system of claim 1, wherein an authentication database is automatically updated by the access controller based at least in part on an event-based operation, a triggering event of the event-based operation including a client device of the first subnetwork going offline or coming online.

12. The computer system of claim 1, wherein the at least one intermediate relay node includes at least a first intermediate relay node and a second intermediate relay node, wherein the first intermediate relay node manages the first subnetwork of client devices and the second intermediate relay node manages a second subnetwork of client device.

13. The computer system of claim 12, wherein the client devices of the first subnetwork are configured to communicate with the access controller and the network link through the first intermediate relay node, and wherein the client devices of the second subnetwork are configured to communicate with the access controller and the network link through the second intermediate relay node.

14. A method of network authentication in a computer network, the method comprising:
    providing a connection to a network via a network link;
    providing, by an authentication, authorization, and accounting (AAA) server, AAA management for the network link;
    communicating with the AAA server and controlling access to the network link via an access controller; and
    routing a request from a client device by managing a control path and a data path for a first subnetwork of one or more client devices via at least one intermediate relay node;
    wherein when the at least one intermediate relay node determines the client device of the first subnetwork is not listed in an authentication database as an authenticated client device, the at least one intermediate relay node routing the request from the client device to the access controller through the control path instead of the data path.

15. The method of claim 14, wherein traffic in the control path includes information exchanged between the client device and the AAA server; information exchanged between the client device and a web server; or information exchanged between the client device and the AAA server and information exchanged between the client device and the web server; and wherein traffic in the data path includes information exchanged between the client device and a wide area network (WAN), the network link comprising the WAN.

16. The method of claim 15, wherein when a client device of the first subnetwork of client devices requests network access, the at least one intermediate relay node determines whether the client device is authenticated.

17. The method of claim 16, wherein the at least one intermediate relay node determining whether the client device is authenticated comprises the at least one intermediate relay node receiving identifying information from the client device and determining whether the identifying information from the client device matches an entry in an authentication database.

18. The method of claim 17, wherein when the at least one intermediate relay node determines the identifying information from the client device matches the entry in the authentication database, the at least one intermediate relay node routes the request from the client device to a default router in the data path.

19. A non-transitory computer-readable storage medium for authenticating and managing network traffic, the non-transitory computer-readable storage medium storing computer executable instructions that when executed by a processor cause the processor to perform the steps of:
providing a connection to a network via a network link;
providing, by an authentication, authorization, and accounting (AAA) server, AAA management for the network link;
communicating with the AAA server and controlling access to the network link via an access controller; and
routing a request from a client device by managing a control path and a data path for a first subnetwork of one or more client devices via at least one intermediate relay node;
wherein when the at least one intermediate relay node determines the client device of the first subnetwork is not listed in an authentication database as an authenticated client device, the at least one intermediate relay node routing the request from the client device to the access controller through the control path instead of the data path.

* * * * *